H. B. FARGO.

HARROW-TEETH.

No. 7,180. Reissued June 20, 1876.

Attest:
Courtney A. Cooper.
Frank Mifsum.

H. B. Fargo
By his atty,
Charles Foster

N. PETERS, PHOTO-LITHOGRAPHER, WASHINGTON, D. C.

BEST AVAILABLE COPY

UNITED STATES PATENT OFFICE.

HENRY B. FARGO, OF FOND DU LAC, WISCONSIN.

IMPROVEMENT IN HARROW-TEETH.

Specification forming part of Letters Patent No. 153,430, dated July 28, 1874; reissue No. 7,180, dated June 20, 1876; application filed June 9, 1876.

*To all whom it may concern:*

Be it known that I, HENRY B. FARGO, of Fond du Lac, Fond du Lac county, State of Wisconsin, have invented an Improved Harrow-Tooth, of which the following is a specification:

This invention relates to the construction of the tooth, whereby it is reduced in weight, strengthened, and rendered more effective.

Figure 1:
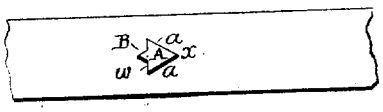
Figure 2:
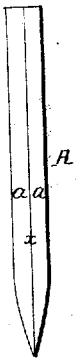
Figure 3:
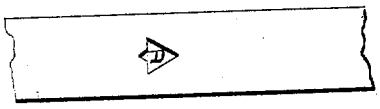
Figure 4:
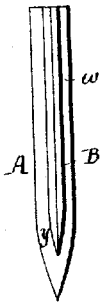
Figure 5:
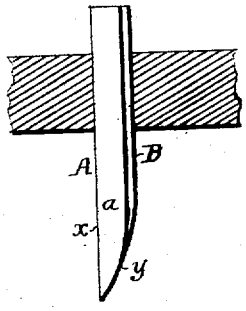

Figure 1 is a view of the top end of the tooth. Fig. 2 is a front view of the tooth. Fig. 3 is a view of a section of the harrow bar or beam, showing the peculiar hole wherein the tooth is placed and held. Fig. 4 is a rear view of the tooth. Fig. 5 is a sectional view of part of a harrow, showing a tooth set in the bar.

The tooth A is of steel or other metal, and, in cross-section, approximates a triangle having two plain inclined faces, *a a*, which meet, forming a straight vertical edge, *x*. B is a narrow V-shaped rib, parallel to the edge *x* upon the opposite face *w* of the tooth, and extending downward to where the tooth commences to point. The point is formed by cutting the tooth-bar downward from the broad side to the edge *x*, forming a beveled face, *y*. This completes the formation of the tooth, and, in addition to giving it greater strength, constitutes a broad side or base, *w*, against which the grain of the wood of the harrow-beam binds hard and close. D is the mortised hole in the harrow-beam, made in shape to receive the tooth above described, and, in a V-shaped harrow, is so cut that the tooth, instead of setting straight or parallel with the grain of the wood, is placed slightly sidewise, so as to be parallel with the line of draft.

I claim—

1. A harrow-tooth approximating a triangle in cross-section, having inclined faces *a a*, meeting and forming a straight edge, *x*, and inclined from the wide toward the narrow edge, forming a beveled face, *y*, substantially as set forth.

2. A harrow-tooth approximating an equilateral triangle in cross-section, and pointed by being beveled from the wide side downward to the opposite and longest edge *x*, as set forth.

3. The tooth A, of triangular form, as shown, and having a narrow V-shaped tongue or ridge, B, raised on the center of the face *w*, running lengthwise of the tooth down to where it commences to point, substantially as and for the purposes set forth.

In testimony whereof I have signed my name to this specification in the presence of two subscribing witnesses.

H. B. FARGO.

Witnesses:
CHARLES E. FOSTER,
COURTNEY A. COOPER.